US010156499B1

(12) United States Patent
Stearns

(10) Patent No.: US 10,156,499 B1
(45) Date of Patent: Dec. 18, 2018

(54) FOCUSED ACOUSTIC RADIATION FOR THE EJECTION OF SUBWAVELENGTH DROPLETS

(71) Applicant: Labcyte Inc., Sunnyvale, CA (US)

(72) Inventor: Richard G. Stearns, Soquel, CA (US)

(73) Assignee: Labcyte Inc., San Jose, CA (US)

( * ) Notice: Subject to any disclaimer, the term of this patent is extended or adjusted under 35 U.S.C. 154(b) by 310 days.

(21) Appl. No.: 14/041,156

(22) Filed: Sep. 30, 2013

Related U.S. Application Data

(60) Provisional application No. 61/708,576, filed on Oct. 1, 2012.

(51) Int. Cl.
*G01N 1/28* (2006.01)
*G01N 1/10* (2006.01)

(52) U.S. Cl.
CPC .................................... *G01N 1/10* (2013.01)

(58) Field of Classification Search
CPC ....................................................... G01N 1/28
See application file for complete search history.

(56) References Cited

U.S. PATENT DOCUMENTS

| | | | | |
|---|---|---|---|---|
| 4,308,547 | A * | 12/1981 | Lovelady et al. | 347/46 |
| 6,416,164 | B1 * | 7/2002 | Stearns et al. | 347/46 |
| 8,171,798 | B2 * | 5/2012 | Van Tuyl et al. | 73/597 |
| 2013/0252246 | A1 * | 9/2013 | Goodlett et al. | 435/6.12 |

* cited by examiner

*Primary Examiner* — Robert R Raevis
(74) *Attorney, Agent, or Firm* — Kilpatrick Townsend & Stockton LLP

(57) ABSTRACT

Focused acoustic radiation, referred to as toneburts, are applied to a volume of liquid to generate a set of droplets. The droplets generated are substantially smaller in scale than the focal spot size of the acoustic beam (e.g., the frequency at which the acoustic transducer operates). Further, the droplets have trajectories that are substantially in the direction of the acoustic beam propagation direction. In one embodiment, a first toneburst is applied to temporarily raise a protuberance on a free surface of the fluid. After the protuberance has reached a certain state, a second toneburst is applied to the protuberance to break it into very small droplets. In one embodiment, the state of the protuberance at which the second toneburst is supplied is the time period shortly after the protuberance reaches its maximum height but before the protuberance recedes back into the volume of fluid.

39 Claims, 6 Drawing Sheets

FOCUSED ACOUSTIC RADIATION FOR THE EJECTION OF SUBWAVELENGTH DROPLETS

CROSS REFERENCE TO RELATED APPLICATIONS

This application claims priority under 35 U.S.C. § 119(e) to U.S. Provisional application Ser. No. 61/708,576, filed on Oct. 1, 2012, which is incorporated herein by reference in its entirety.

BACKGROUND

This invention relates generally to devices and methods for rapidly transferring samples to analytical devices. More particularly, the invention relates to the use of focused acoustics to eject fluid as droplets from a larger volume.

In life science research and clinical diagnostics, there is a need to manipulate and analyze minute quantities of sample materials. Analyzing the constituents of a fluid sample may require the sample to be dispersed into a spray of small droplets or loaded in a predetermined quantity. Often, a combination of a nebulizer and a spray chamber is used in sample introduction, wherein the nebulizer produces the spray of droplets, and the droplets are then forced through a spray chamber and sorted. Such droplets may be produced through a number of methods, such as those that employ ultrasonic energy and/or use a nebulizing gas. However, such nebulizers provide little control over the distribution of droplet size and no meaningful control over the trajectory of the droplets. As a result, the yield of droplets having an appropriate size and trajectory is low. In addition, the analyte molecule may be adsorbed in the nebulizer, and large droplets may condense on the walls of the spray chamber. As a result, the combination suffers from low analyte transport efficiency and high sample consumption.

An alternate method of fluid delivery is surface wetting, but this method is often a source of sample waste. For example, capillaries having a small interior channel for fluid transport are often employed in sample fluid handling by submerging their tips into a pool of sample. In order to provide sufficient mechanical strength for handling, such capillaries must have a large wall thickness as compared to the interior channel diameter. Since any wetting of the exterior capillary surface results in sample waste, the high wall thickness/channel diameter ratio exacerbates sample waste. In addition, the sample pool has a minimum required volume driven not by the sample introduced into the capillary but rather by the need to immerse the large exterior dimension of the capillary. As a result, the sample volume required for capillary submersion may be more than an order of magnitude larger than the sample volume transferred into the capillary. Moreover, if more than one sample is introduced into a capillary, the previously immersed portions of the capillary surface must be washed between sample transfers in order to eliminate cross contamination. Cross contamination in the context of mass spectrometry results in a memory effect wherein spurious signals from a previous sample compromises data interpretation. In order to eliminate the memory effect, then, increased processing time is required to accommodate the washings between sample introductions.

Acoustic droplet ejection, a form of nozzle-less fluid ejection, provides a method to introduce fluid samples into analytical devices without cross contamination as acoustic energy can move the liquid and not require a solid surface such as a capillary or nozzle for the fluid transfer. For example, directing focused acoustic radiation near the surface of the fluid sample in a reservoir generates a single droplet with a trajectory towards the inlet to an analytic device. Additional droplets can be generated by repeating the process of directing the acoustic radiation, and additionally ensuring that focus is maintained at the surface of the fluid, as the height of the fluid surface changes in the reservoir in response to its depletion. This can be achieved by translating the focus of the acoustic radiation in order to track the height of the fluid surface, for example by moving the entire acoustic radiation generator, typically a piezoelectric transducer, in response to the depletion of the fluid. Droplet size is very consistent as the sample reservoir is drained, and this can be to depths as low as a few droplet diameters. Since the droplet is formed by the momentum transferred to the fluid by the focused acoustic radiation, the trajectory of the droplet generally follows the direction of the acoustic beam and the dimension of the droplet is largely determined by the focal spot size which depends on the acoustic wavelength, F-number in the sample fluid, and hydrodynamics of droplet breakup.

In contrast to the focused acoustic ejection of a controlled, single droplet, there are higher energy density methods, like atomization and nebulization that can generate a multiplicity of droplets with less deterministic trajectory and diameters typically far smaller than the focused beam size. Often these methods operate near cavitation energy densities, and they can even intentionally be substantially out of focus or in some cases operate with planar acoustics (piezo generators with no lensing). This method can be seen in misters (suitable for humidification of rooms) which use a piezoelectric transducer directed at a liquid surface, whose height is maintained at a predetermined level by an inverted bottle feeder. This configuration requires a substantial amount of material to maintain the fluid path and cannot be easily switched from one fluid to another. In nebulizers specifically adapted for switching between fluids, the fluid flows through the interior bore of a hollow needle and onto a planar diaphragm at which focused acoustic radiation is directed. The fluid forms a film, much of which will be nebulized by pulses applied to a planar diaphragm. The method does not nebulize all the fluid (only a maximum of 30%) so the remaining un-nebulized fluid must be removed to prepare the surface for the next fluid and minimize cross-contamination. This method also requires an empirical determination of the acoustic power required for nebulization of the fluid.

Focused acoustic devices have been employed for sample loading by directing a burst of focused acoustic radiation at a focal point near the surface of the fluid sample in order to form a single droplet whose size is comparable to the size of the acoustic wavelength of the sound energy in the burst. Each subsequent burst of focused acoustic radiation creates a single, similarly sized droplet, provided the relative focus can be maintained as the fluid is ejected from the sample.

"High-throughput" methods for mass spectrometry loading that combine aspiration from microplates and desalting with mass spectrometry loading offer speed advantages over manual methods, but they are limited to moving fluids by aspiration and time constraints of valving. Sample-to-sample times remain on the order of a second or longer.

There is growing interest in the analytical research and clinical diagnostics for high-throughput mass spectrometry (HTMS). HTMS is severely hampered by the lack of easily automated sample preparation and loading, the need to conserve sample, the need to eliminate cross contamination, the inability to go directly from one container (a microplate well) into the analytical device, and the inability to generate droplets of the appropriate size.

SUMMARY

Focused acoustic radiation, referred to as tonebursts, are applied to a volume of liquid to generate a set of droplets. The droplets generated by the methods herein are substantially smaller in scale than the focal spot size of the acoustic beam which is typically on the order of the acoustic wavelength in the fluid or larger depending upon the F-number of lens applying the acoustic radiation. Stated differently, the droplets created are substantially smaller than both the acoustic wavelength in the fluid and the focal spot size at the fluid surface. The droplets may be referred to as subwavelength diameter droplets, as the diameters of the droplets are smaller than the acoustic wavelength in the fluid. Further, the droplets have trajectories that are substantially in the direction of the acoustic beam propagation direction. In one embodiment, a first toneburst is applied to temporarily raise a mound (or protuberance) on a free surface of the fluid. After the mound has reached a certain state, a second toneburst is applied to the mound to break it into the subwavelength diameter droplets. In one embodiment, the state of the mound at which the second toneburst is supplied is the time period after the mound reaches its maximum height but before the mound recedes back into the volume of fluid.

A droplet ejection device can be used to make a multiplicity of droplets from a single mound in a controlled manner where the device can determine the focus and power required to achieve this and to maintain proper power and focus while depleting only as much of the sample as is required for the analysis. For example, the device can be used to deliver a controlled stream of droplets to an analytical device with a size range suited for the device, reduce sample waste, extract sample directly from standard storage containers (like microplates), eliminate consumables, and to switch from one source fluid to another rapidly and without human intervention.

The FIGs. depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

I. Droplet Ejection

Ejection of fluid droplets from a reservoir of fluid is accomplished through the use of focused acoustic radiation (acoustic waves, acoustic energy) of sufficient intensity incident on a free fluid surface. The focused acoustic radiation has a plurality of non-simultaneous and discrete frequency ranges that at least determines in part the volume and/or velocity of the ejected droplets. As a result, a wide range of droplet volumes and/or velocities may be produced. For example, depending upon the timing and frequencies of the applied tonebursts, the volume, velocity, and direction of the ejected droplets may be controlled. Ejected droplets have a number of uses, examples of which include forming biomolecular arrays, formatting fluids (e.g., to transfer fluids from odd-sized bulk containers to wells of a standardized well plate or to transfer fluids from one well plate to another), and for use in loading analytical instruments such as a mass spectrometer.

I.A. F-Number

Figure 1A:
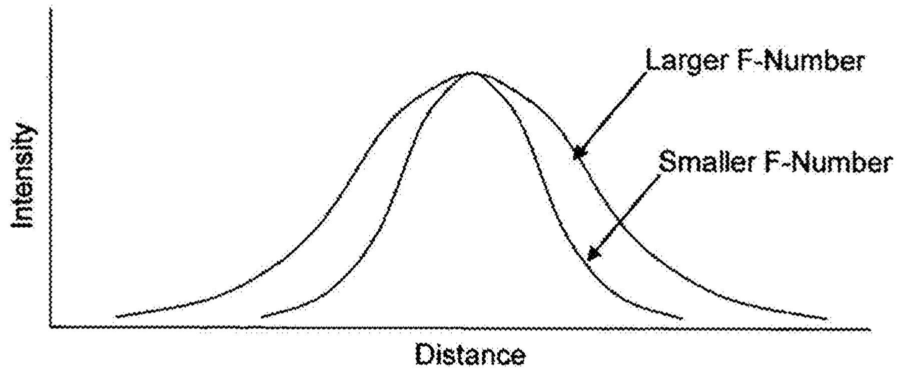
FIGS. 1A and 1 B, collectively referred to as FIG. 1, illustrate the effect of F-number and wavelength on the focused acoustic radiation intensity profile, as a function of radial distance across the acoustic beam.
Figure 1B:
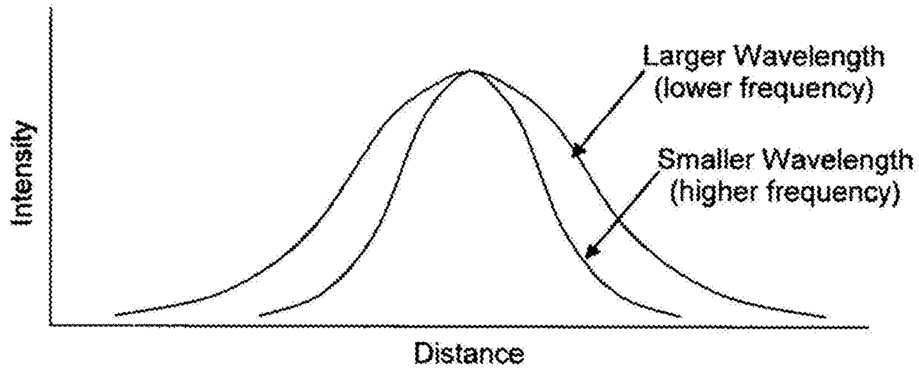

The droplet ejection methods described herein are particularly suited for use with a focusing system having a high F number, e.g., F-number 1 or greater. As depicted in FIG. 1, various factors affect the spatial distribution of the intensity profile of the acoustic radiation across the surface of the acoustic generator and consequently at the fluid surface of the surface. For example, F-numbers represent the ratio of the distance from the focusing system to the focal point of the focusing system with respect to the size of the aperture though which the acoustic radiation passes into the fluid medium. All else being equal, a lens of a smaller F-number tends to generate a more tightly focused acoustic radiation (e.g., smaller spot size), as illustrated in FIG. 1A, than a lens of a higher F-number. Similarly, as illustrated in FIG. 1B, acoustic radiation having a higher frequency may be focused over a smaller surface area than acoustic radiation having a lower frequency.

In particular, lenses having an F-number less than one are considered to generate tightly focused acoustic beams. The focal distance of such a lens is shorter than the width of the lens aperture. Such an F-number limits at least one of the performance of the droplet ejection, the flexibility to construct a physical system to eject droplets of different size, and the ability to place strong constraints on the tolerance of an ejection system to the variation of certain critical parameters such as the location of the fluid surface with respect to the focal plane of the acoustic beam. In addition, using such an F-number limits the ability of a system to eject droplets from the top of a fluid layer of height h, when the acoustic beam must past through an aperture of width substantially less than h, at the bottom of the fluid layer. Such a configuration is of interest for many applications, particularly when the reservoirs for containing the fluid to be ejected take the form of conventionally used and commercially available well plates. Typical 1536 well plates from Greiner have height (H) to aperture (A) ratios of 3.3 (5H/1.53 A millimeters (mm)). Plates from Greiner and NUNC in 384 well format range from 3 to 4 (5.5H/1.84 A mm and 11.6H/2.9 A mm). Additional manufactures of suitable well plates for use in the employed device include Labcyte Inc., (Sunnyvale, Calif.), Corning, Inc. (Corning, N.Y.) and Greiner America, Inc. (Lake Mary, Fla.).

I.B. Acoustic Radiation

Figure 2A:
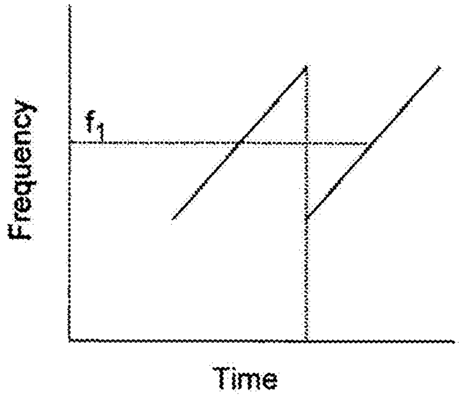
FIG. 2A depicts acoustic radiation having a plurality of non-simultaneous and discrete repeating frequency ranges in the form of linear acoustic sweeps.
Figure 2B:
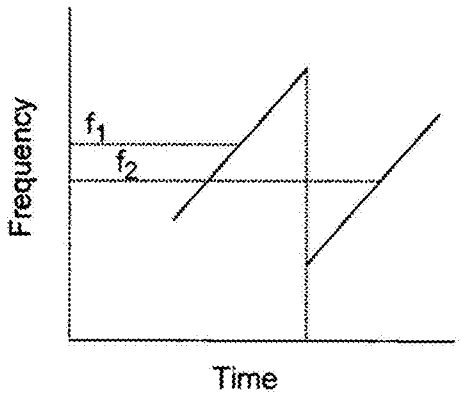
FIG. 2B depicts acoustic radiation having a plurality of non-simultaneous and discrete frequency ranges in the form of multi-range linear acoustic sweeps.
Figure 2C:
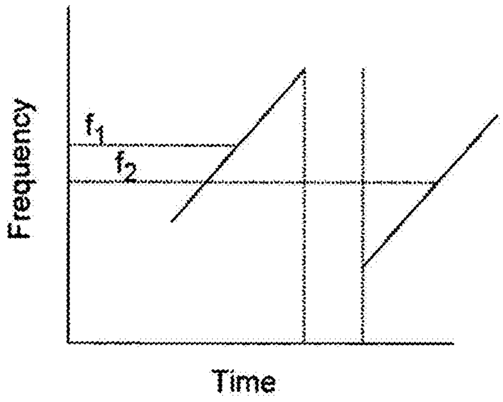
FIG. 2C depicts acoustic radiation having a plurality of non-simultaneous and discrete frequency ranges in the form of multi-range linear acoustic sweeps separated by a period of silence.

FIGS. 2A-C graphically represents of different types of tonebursts. Tonebursts may include acoustic radiation of varying frequency, duration, amplitude, profile, order, and other characteristics. Tonebursts may be broken up into toneburst segments (also referred to as waveform segments) having different properties from segments of the same toneburst. Tonebursts may differ with respect to any or all of these properties, which allows for significant variation in the range of ejected fluid volume, the number of ejected droplets, and the velocity of those droplets.

Some tonebursts will include linear or nonlinear sweeps through a range of frequencies, where the median or mean frequency of the range is referred to as an acoustic center frequency. Non-simultaneous frequency ranges are frequency ranges that do not sound together over their entire duration. For example, two frequency ranges are non-simultaneous when one sounds for a time period during which the other does not sound. Thus, non-simultaneous frequency ranges may, in some instances, sound over a common period of time. Accordingly, non-simultaneous and discrete frequency ranges refers to at least two sound waves, each having at least two frequencies but sounding over different periods of time. In some instances, non-simultaneous and discrete frequency ranges may overlap in frequency and/or in time. Alternatively, non-simultaneous and discrete frequency ranges may not overlap in frequency and/or time. Graphical representations of exemplary acoustic radiation having a plurality of non-overlapping, non-simultaneous and discrete frequency ranges are provided in FIG. 2A-2C.

The acoustic radiation depicted in FIGS. 2A-2C are each individually suitable for use in ejecting droplets. For example, FIG. 2A depicts two tonebursts having a plurality of non-simultaneous and discrete repeating frequency ranges in the form of linear acoustic sweeps. The linear acoustic sweeps have identical upper and lower frequency limits, exhibit identical profiles (slopes), and display the same acoustic center frequency f1. FIG. 2B depicts acoustic radiation similar to that depicted in FIG. 2A except that the linear acoustic sweeps have different frequency limits and different acoustic center frequencies f1 and C. FIG. 2C depicts acoustic radiation similar to that depicted in FIG. 2B except that a period of silence separates the linear acoustic sweeps of acoustic center frequencies f1 and f2.

It is, of course, understood that optimal variations of the above-discussed parameters will depend upon the desired ejected droplet volume and velocity and the number of droplets desired. For example, different fluids may have different viscosities, surfactant concentrations, or other properties. Consequently, the operating parameters of tonebursts including, for example, frequency ranges, powers, and tonebursts durations needed to generate droplets of a specific form or size may vary from fluid to fluid. Specific choice of specific fluids, lenses, frequencies and frequency ranges, and amplitudes may all vary depending upon the implementation.

II. Droplet Ejection Device

Figure 5A:
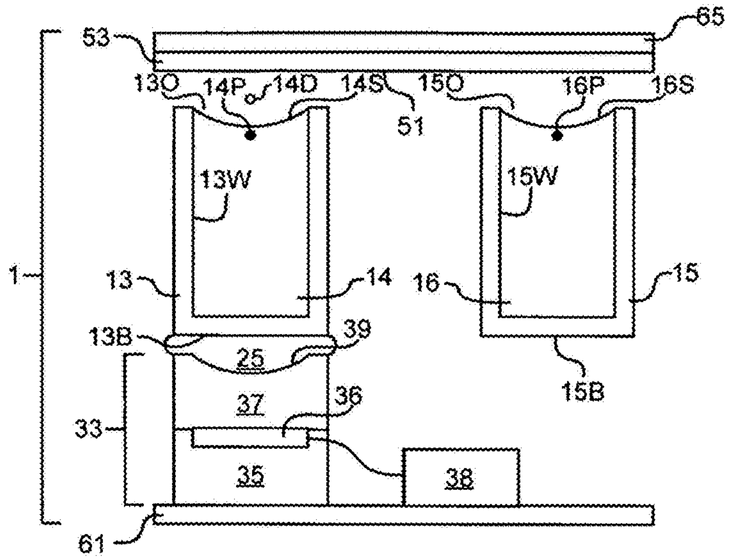
FIGS. 5A and 5B, collectively referred to as FIG. 5, depicts a simplified cross-sectional view of a droplet ejection device capable of ejecting subwavelength fluid droplets from a reservoir, according to one embodiment.
Figure 5B:
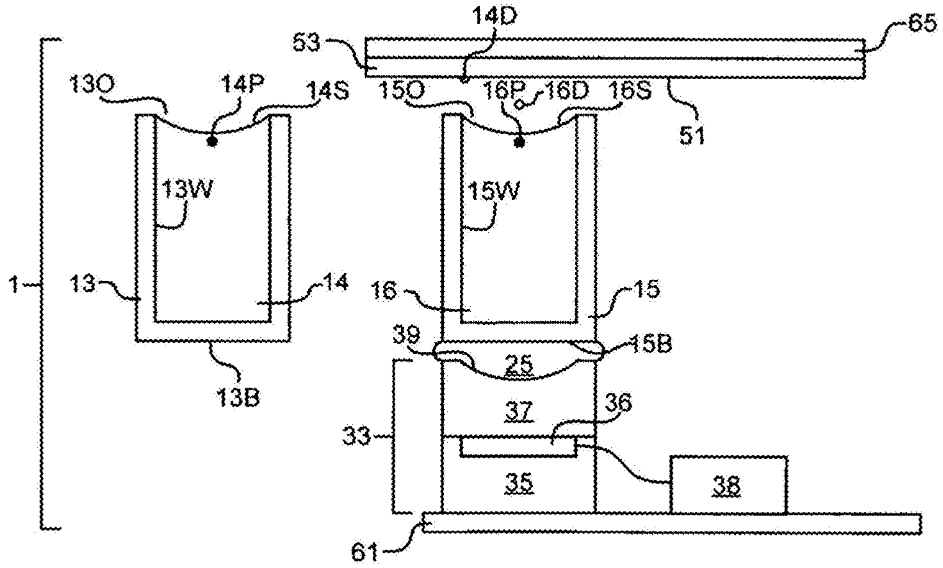

FIG. 5 depicts a simplified cross-sectional view of an exemplary embodiment of a droplet ejection device (or device) that allows for the ejection of subwavelength fluid droplets from one or more reservoirs. As depicted, the device comprises first and second reservoirs, an acoustic ejector, an analyzer, an ejector positioning device, and a target positioning device. FIG. 5A shows the acoustic ejector acoustically coupled to the first reservoir; the ejector is activated in order to eject droplets of fluid from within the first reservoir toward a site on a substrate surface to form an array. FIG. 5B shows the acoustic ejector acoustically coupled to a second reservoir.

II.A. Reservoirs and Fluids

A reservoir/s is a receptacle or chamber for containing a fluid. Typically, a fluid contained in a reservoir will have a free surface, e.g., a surface that allows acoustic radiation to be reflected therefrom or a surface from which a droplet may be acoustically ejected. A reservoir may also be a locus on a substrate surface within which a fluid is constrained.

The one or more reservoirs of the device, for example reservoirs 13 and 15, have a height-to diameter-ratio greater than one and are generally substantially identical construction so as to be substantially acoustically indistinguishable, however identical construction is not required. The reservoirs are shown as separate removable components but may, as discussed above, be fixed within a plate or other substrate. For example, the plurality of reservoirs may comprise individual wells in a well plate, optimally although not necessarily arranged in an array. Each of the reservoirs 13 and 15 is preferably axially symmetric as shown, having vertical walls 13W and 15W extending upward from circular reservoir bases 13B and 15B and terminating at openings 130 and 150, respectively, although other reservoir shapes may be used. The material and thickness of each reservoir base should be such that acoustic radiation may be transmitted therethrough and into the fluid contained within the reservoirs.

The device may be constructed to include the reservoirs as an integrated or permanently attached component of the device. However, to provide modularity and interchangeability of components, the device is generally constructed with removable reservoirs. The reservoirs are preferably arranged in a pattern or an array to provide each reservoir with individual systematic addressability. In addition, while each of the reservoirs may be provided as a discrete or stand-alone item, in circumstances that require a large number of reservoirs, it is preferred that the reservoirs be attached to each other or represent integrated portions of a single reservoir unit. For example, the reservoirs may represent individual wells in a well plate. Many well plates suitable for use with the device are commercially available and may contain, for example, 96, 384, 1536, or 3456 wells per well plate, having a full skirt, half skirt, or no skirt. The wells of such well plates typically form rectilinear arrays. However, the availability of such commercially available well plates does not preclude the manufacture and use of custom-made well plates containing at least about 10,000 wells, or as many as 100,000 to 500,000 wells, or more. The wells of such custom-made well plates may form rectilinear or other types of arrays.

Each reservoir, for example reservoirs 13 and 15, is adapted to contain a fluid having a fluid surface. As shown, the first reservoir 13 contains a first fluid 14 and the second reservoir 15 contains a second fluid 16. Fluids 14 and 16 each have a fluid surface respectively indicated at 14S and 16S. Fluids 14 and 16 may the same or different. A fluid is matter that is nonsolid, or at least partially gaseous and/or liquid, but not entirely gaseous. A fluid may contain a solid that is minimally, partially, or fully solvated, dispersed, or suspended. Examples of fluids include, without limitation, aqueous liquids (including water per se and salt water) and nonaqueous liquids such as organic solvents and the like.

The material used in the construction of reservoirs must be compatible with the fluids contained therein. Thus, if it is intended that the reservoirs or wells contain an organic solvent such as acetonitrile, polymers that dissolve or swell in acetonitrile would be unsuitable for use in forming the reservoirs or well plates. Similarly, reservoirs or wells intended to contain DMSO must be compatible with DMSO. For water-based fluids, a number of materials are suitable for the construction of reservoirs and include, but are not limited to, ceramics such as silicon oxide and aluminum oxide, metals such as stainless steel and platinum, and polymers such as polyester and polytetrafluoroethylene. For fluids that are photosensitive, the reservoirs may be constructed from an optically opaque material that has sufficient acoustic transparency for substantially unimpaired functioning of the device.

In addition, to reduce the amount of movement and time needed to align the acoustic radiation generator with each reservoir or reservoir well during operation, it is preferable that the center of each reservoir be located not more than about 1 centimeter, more preferably not more than about 1.5 millimeters, still more preferably not more than about 1 millimeter and optimally not more than about 0.5 millimeter, from a neighboring reservoir center. These dimensions tend to limit the size of the reservoirs to a maximum volume. The reservoirs are constructed to contain typically no more than about 1 mL, preferably no more than about 1 uL, and optimally no more than about 1 nL, of fluid. To facilitate handling of multiple reservoirs, it is also preferred that the reservoirs be substantially acoustically indistinguishable.

Figure 6A:
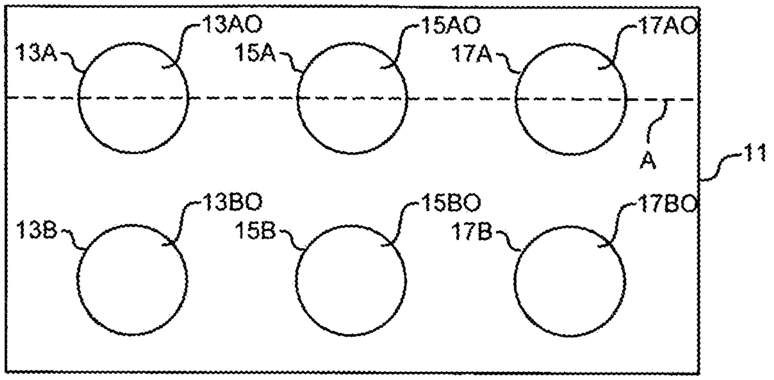
FIGS. 6A-6C, collectively referred to as FIG. 6, schematically illustrate a rectilinear array of reservoirs in the form of a well plate having three rows and two columns of wells each having a low height-to-diameter ratio for use with the device embodiment in FIG. 5, according to one embodiment.
Figure 6B:
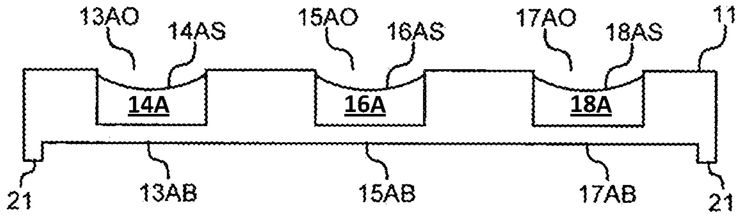
Figure 6C:
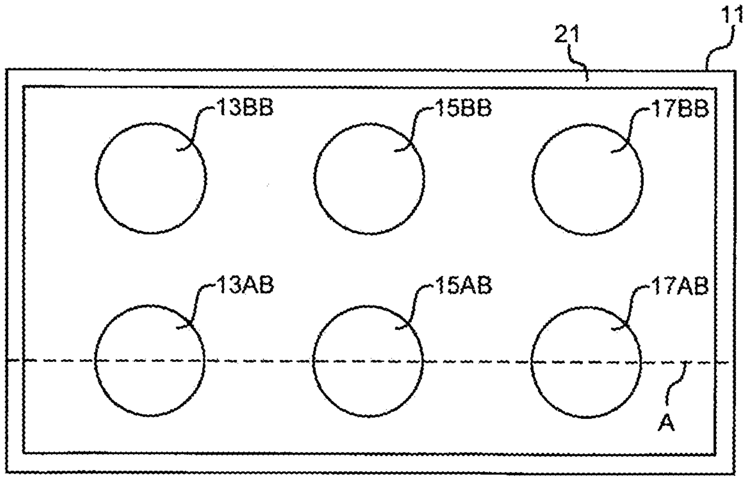

FIG. 6 schematically illustrates an exemplary rectilinear array of reservoirs that may be used in the device. The reservoir array is provided in the form of a well plate 11 having three rows and two columns of wells. As depicted in FIGS. 6A and 6C, wells of the first, second, and third rows of wells are indicated at 13A and 13B, 15A and 15B, and 17A and 17B, respectively. Each is adapted to contain a fluid having a fluid surface. As depicted in FIG. 6B, for example, reservoirs 13A, 15A, and 17A contain fluids 14A, 16A, and 18A, respectively. The fluid surfaces for each fluid are indicated at 14AS, 16AS, and 18AS. As shown, the reservoirs have a height-to diameter-ratio less than one and are of substantially identical construction so as to be substantially acoustically indistinguishable, but identical construction is not a requirement. Each of the depicted reservoirs is axially symmetric, having vertical walls extending upward from circular reservoir bases indicated at 13AB, 13BB, 15AB, 15BB, 17AB, and 17BB, and terminating at corresponding openings indicated at 13A0, 13B0, 15A0, 1580, 17A0, and 17B0. The bases of the reservoirs form a common exterior lower surface 19 that is substantially planar. Although a full well plate skirt (not shown) may be employed that extends from all edges of the lower well plate surface, as depicted, partial well plate skirt 21 extends downwardly from the longer opposing edges of the lower surface 19. The material and thickness of the reservoir bases are such that acoustic radiation may be transmitted therethrough and into the fluid contained within the reservoirs.

II.B. Acoustic Ejector

The acoustic ejector 33 is adapted to generate and focus acoustic radiation so as to eject a droplet of fluid from each of the fluid surfaces 14S and 16S when acoustically coupled to reservoirs 13 and 15, and thus to fluids 14 and 16, respectively. The acoustic ejector 33 includes an acoustic radiation generator 35 and a focusing system 37 that together may function as a single unit controlled by a single controller, or they may be independently controlled, depending on the desired performance of the device.

Typically, single ejector 33 designs are preferred over multiple ejector designs because accuracy of droplet placement and consistency in droplet size and velocity are more easily achieved with a single ejector. When a single acoustic ejector is employed, the positioning system should allow for the ejector to move from one reservoir to another quickly and in a controlled manner. In order to ensure optimal performance, it is important to keep in mind that there are two basic kinds of motion: pulse and continuous. Pulse motion involves the discrete steps of moving an ejector into position, keeping it stationary while it emits acoustic radiation, and moving the ejector to the next position; again, using a high performance positioning system allows repeatable and controlled acoustic coupling at each reservoir in less than 0.1 second. Typically, the pulse width is very short and may enable over 10 Hz reservoir transitions, and even over 1000 Hz reservoir transitions. A continuous motion design, on the other hand, moves the acoustic radiation generator and the reservoirs continuously, although not at the same speed. As discussed above, the reservoirs may be constructed to reduce the amount of movement and time needed to align the acoustic radiation generator with each reservoir or reservoir well during operation. In short, either or both of the reservoirs and the ejector may be moved, simultaneously or otherwise.

There are also a number of ways to acoustically couple the ejector 33 to each individual reservoir and thus to the fluid therein. Acoustic coupling is where an object is placed in direct or indirect contact with another object so as to allow acoustic radiation to be transferred between the objects without substantial loss of acoustic radiation. When two entities are indirectly acoustically coupled, an acoustic coupling medium provides an intermediary through which acoustic radiation may be transmitted. Thus, an ejector may be acoustically coupled to a fluid, such as by immersing the ejector in the fluid, or by interposing an acoustic coupling medium between the ejector and the fluid, in order to transfer acoustic radiation generated by the ejector through the acoustic coupling medium and into the fluid.

One way to acoustically couple is through direct contact wherein a focusing system constructed from a hemispherical crystal having segmented electrodes is submerged in a liquid to be ejected. In one implementation, the focusing system may be positioned at or below the surface of the liquid. However, this approach for acoustically coupling the focusing system to a fluid is undesirable when the ejector 33 is used to eject different fluids in a plurality of containers or reservoirs, as repeated cleaning of the focusing system would be required in order to avoid cross-contamination. The cleaning process would necessarily lengthen the transition time between each droplet ejection event. In addition, in such a method, fluid would adhere to the ejector as it is removed from each container, wasting material that may be costly or rare.

Another coupling approach would be to acoustically couple the ejector 33 to the reservoirs and reservoir fluids without contacting any portion of the ejector, e.g., the focusing system, with any of the fluids to be ejected. To this end, the ejection device provides an ejector positioning system for positioning the ejector in controlled and repeatable acoustic coupling with each of the fluids in the reservoirs to eject droplets therefrom without submerging the ejector therein. This typically involves direct or indirect contact between the ejector and the external surface of each reservoir. When direct contact is used in order to acoustically couple the ejector to each reservoir, it is preferred that the direct contact is wholly conformal to ensure efficient acoustic radiation transfer. That is, the ejector and the reservoir should have corresponding surfaces adapted for mating contact. Thus, if acoustic coupling is achieved between the ejector and reservoir through the focusing system, it is desirable for the reservoir to have an outside surface that corresponds to the surface profile of the focusing system. Without conformal contact, efficiency and accuracy of acoustic radiation transfer may be compromised. In addition, since many focusing systems have a curved surface, the direct contact approach may necessitate the use of reservoirs having a specially formed inverse surface.

Optimally, acoustic coupling is achieved between the ejector and each of the reservoirs through indirect contact, as illustrated in FIG. 5A. In this figure, an acoustic coupling medium 25 is placed between the ejector 33 and the base 13B of reservoir 13, with the ejector and reservoir located at a predetermined distance from each other. The acoustic coupling medium may be an acoustic coupling fluid, preferably an acoustically homogeneous material in conformal contact with both the acoustic focusing system 37 and each reservoir. In addition, it is important to ensure that the fluid medium is substantially free of material having different acoustic properties than the fluid medium itself. Furthermore, it is preferred that the acoustic coupling medium is comprised of a material having acoustic properties that facilitate the transmission of acoustic radiation without significant attenuation in acoustic pressure and intensity. Also, the acoustic impedance of the coupling medium should facilitate the transfer of energy from the coupling medium into the container. As shown, the first reservoir 13 is acoustically coupled to the acoustic focusing system 37, such that an acoustic wave is generated by the acoustic radiation generator and directed by the focusing system 37 into the acoustic coupling medium 25, which then transmits the acoustic radiation into the reservoir 13.

In one embodiment, the ejector is coupled to wells of a well plate at a rate of at least about 96 wells per minute. Faster coupling rates of at least about 384, 1536, and 3456 wells per minute are achievable with present day technology as well. In one embodiment, a device can be configured to couple a single ejector successively to each well of most (if not all) well plates that are currently commercially available. Proper implementations are capable of yielding a coupling rate of at least about 10,000 wells per minute.

II.B.i. Acoustic Radiation Generator

As introduced above, the acoustic ejector 33 includes an acoustic radiation generator 35. The acoustic radiation generator 35 may be made of any type of vibrational element or transducer 36. For example, a transducer may use a piezoelectric element to convert electrical energy into mechanical energy associated with acoustic radiation. The piezoelectric element may be shared with a separate analyzer, as further described below. As shown in FIG. 5, a combination unit 38 is provided that both serves as a controller for the acoustic radiation generator 35 and a component of an analyzer. Operating as a controller, the combination unit 38 provides the piezoelectric element 36 with electrical energy that is converted into mechanical and acoustic radiation. Operating as a component of an analyzer, the combination unit receives and analyzes electrical signals from the transducer. The electrical signals are produced as a result of the absorption and conversion of mechanical and acoustic radiation by the transducer.

Alternatively, multiple element acoustic radiation generators such as transducer assemblies may be used. For example, linear acoustic arrays, curvilinear acoustic arrays or phased acoustic arrays may be advantageously used to generate acoustic radiation that is transmitted simultaneous to a plurality of reservoirs. In one embodiment, the single transducer may include at least two separate active areas, such as for example, two concentric annular areas. Upon application of the focused acoustic radiation in a single frequency sweep, the inner annular portion is activated first followed by the activation of the outer annular portion. With this embodiment, the spot size may be adjusted to a desired size without having to use more than one frequency sweep.

When referring to the focal spot size or acoustic wavelength of an acoustic ejector, the droplet ejection provides multiple points along the acoustic path between the ejector and the fluid surface for determination of these quantities. In one embodiment, the construction of the device leads to a three layer refraction path including water coupling, the reservoir bottom, and the reservoir fluid. In many cases, the focal spot size in the well fluid is relatively independent of the acoustic wavelength in the reservoir fluid. However, in some cases the focal spot size is determined based on the acoustic wavelength when determined in the water coupling between the ejector and reservoir. Thus, when referring to acoustic wavelength, we generally refer to the acoustic wavelength in the reservoir assuming a fluid having an acoustic wavelength that is within a factor of 0.7 to 1.3 of the acoustic wavelength in water. More generally, if the ratio of these two wavelengths is significantly different (e.g., significantly greater or less than 1), then the acoustic radiation will not efficiently couple into the reservoir. However, it is still possible to eject droplets outside the range of 0.7 to 1.3.

Two different tonebursts may be produced by the same acoustic generator. In one embodiment, the two tonebursts are produced in an alternating manner. Further, the first and second tonebursts may be separated by a predetermined, dynamic, or fixed time period during which no acoustic radiation is produced that substantially influences the delivery of acoustic energy to the focal spot. For example, the acoustic generator may be completely silent during the time period, or it may produce only interrogation tonebursts during that time period The amplitude of a toneburst may be altered. Generally, higher power will perturb the free surface of the fluid more than lower power. However, surface perturbation is also a function of the amount of time a toneburst is applied. Thus, depending upon the implementation (e.g., based on the fluid in question) and based on the type of toneburst required (droplet forming or interrogation), the relative amplitudes of the tonebursts may be altered, independently or otherwise.

II.B.ii. Focusing System

Also as introduced above, the acoustic ejector 33 includes a focusing system 37. The focusing system 37 focuses the acoustic radiation at a focal point within the fluid at or near the fluid surface from which a droplet is to be ejected.

The acoustic focusing system 37 is either a device separate from the acoustic radiation source that acts like a lens, or is inherently part of the spatial arrangement of acoustic radiation sources to effect convergence of acoustic radiation at the focal point by constructive and destructive interference. The focusing system 37 may be formed in a number of different ways including, for example, using a single solid piece having a curved (e.g., concave) surface 39, and/or using a Fresnel lens. Fresnel lenses may have a radial phase profile that diffracts a substantial portion of acoustic radiation into a predetermined diffraction order at diffraction angles that vary radially with respect to the lens. Thus, if a Fresnel lens is used, diffraction angles should be selected to focus the acoustic radiation within the diffraction order on a desired object plane. For embodiments particularly suited for use with wells having a high height-to diameter ratio, a high-F-number focusing system is used. For example, the focusing system 37 of the inventive device may have an F-number of at least 2 or 3. In other embodiments, the focusing system 37 of FIG. 5 has an F-number greater than 1.

II.C. Ejector and Target Positioning Devices

The ejector positioning device and the target positioning device provide for relative motion between the reservoir/s and an inlet and/or substrate receiving the droplets. The ejector positioning device controls the positioning of the acoustic ejector 33 and/or the reservoir/s. The target positioning device controls the positioning of the substrate receiving ejected droplets.

Either or both of the target and ejector positioning devices may be constructed from, for example, high speed robotic systems, motors, levers, pulleys, gears, a combination thereof, or other electromechanical or mechanical systems. In cases where an array of droplets is being formed, it is preferable to ensure that there is a correspondence between the movement of the substrate, the movement of the ejector, and the activation of the ejector to ensure proper array formation.

II.D. Analyzer

The droplet ejection device may also include an analyzer to assess the contents of the selected reservoirs. For example, the analyzer may be used to determine the height and/or volume of fluid in the reservoir. The analyzer may also be used to determine properties of the fluid in the reservoirs including, but are not limited to, viscosity, surface tension, acoustic impedance, density, solid content, impurity content, acoustic attenuation, and pathogen content. The analyzer uses a detection mechanism, such as a piezoelectric element that may also be used in the acoustic generator 35 in a combined 38 system, to measure reflections of acoustic radiation from the fluid to identify the height and other properties of the fluid.

The analysis may show the need to reposition the acoustic radiation generator 35 with respect to the fluid surface, in order to ensure that the focal point of the ejection acoustic wave is near the fluid surface, where desired. For example, if analysis reveals that the acoustic radiation generator is positioned such that the ejection acoustic wave cannot be focused near the fluid surface, the acoustic radiation generator is repositioned using vertical, horizontal, and/or rotational movement to allow appropriate focusing of the ejection acoustic wave.

II.E. Other Components and Considerations

Generally, resonance should be reduced to the extent possible for all components of the droplet ejection device. Resonance refers to the interaction of acoustic waves in a cavity formed between two reflecting surfaces in which acoustic waves may travel back and forth. For typical ejection applications, one reflecting surface may be the surface of the fluid to be ejected or the surface of the acoustic lens. In addition, other surfaces may correspond to any membranes or structures placed in the acoustic path between the transducer and the free fluid surface such as the bottom of a microplate.

To reduce resonance, neither the reservoir, any fluid contained therein, nor a combination thereof should facilitate resonance of any frequency range of the acoustic radiation generated by the acoustic radiation generator. In addition, when droplets are ejected from different reservoirs, the reservoirs exhibit substantially the same resonance performance relative to any frequency range of the acoustic radiation generated by the acoustic radiation generator. That is, droplet ejection should be insensitive to any slight variations in the frequencies where resonance absorption of transmitted acoustic radiation may occur. Since the methods described herein allow for multiple cycle sweeps over the same frequency range, it is preferred that any energy change due to resonance absorption is "shared" over the whole time period rather than have it impact the early part of the time period in one reservoir and then occur late in the time period in another reservoir.

The transmission of acoustic energy from the acoustic generator 35 to the focus of the acoustic energy may be effected by the presence of resonant reverberations between a pair of surfaces. A resonant system can act like an interference filter where some acoustic frequencies within the frequency range will provide very effective coupling of energy to the fluid surface and other acoustic frequencies within the frequency range may provide very poor energy coupling. In typical situations, due to either thermal drift or mechanical drift, one may expect that the precise frequency of constructive or destructive interference in such a resonant system will drift over time. Hence, the resonant frequency response of a given well in a microplate may change over time. Also, changes from well to well in a microplate of the plate bottom thickness or material properties may also lead to well-to-well variations in resonant frequency response. Thus it is not feasible typically to generate only a single acoustic frequency for the purpose of droplet ejection, as the coupling of acoustic energy to the fluid surface may not be stable with time or across a given microplate. A simple linear chirp throughout the duration of the toneburst, if the extent of the chirp is sufficiently broad to span several acoustic frequencies of constructive and destructive interference in the system, will usually suffice to wash out such resonant behavior. The use of linear chirp makes the system more stable to mechanical, thermal and spatial changes. There is a difficulty however with such an approach, in that as the acoustic frequency is swept over the duration of the toneburst, the acoustic energy effectively coupled to the free fluid surface will vary in time, for example increasing as the chirp frequency approaches a condition of constructive interference, and decreasing as the chirp frequency approaches a condition of destructive interference. This has the potentially undesirable effect of introducing an amplitude modulation to the acoustic excitation of the fluid surface. In order to minimize the effect of this amplitude modulation on the consistency of droplet generation, multiple frequency chirps are introduced over the period of the toneburst excitation (such as illustrated in FIG. 2B). Residual amplitude modulation may still exist in the effective coupling of acoustic energy to the fluid surface, yet any modulation will occur more rapidly over time and be spread more uniformly over the duration of the delivery of acoustic energy. The fluid surface will be more likely in such a case to react to the average energy that is coupled over the duration of the toneburst and to be less sensitive to both time-dependent or well-to-well variations in resonant frequency response.

An ejection device may employ or provide certain additional performance-enhancing functionalities. For example, for fluids that exhibit temperature-dependent properties, a temperature controller, such as thermocouples, may be used in conjunction with such analyses. The temperature controller is employed to improve the accuracy of measurement and may be employed regardless of whether the device includes a fluid dispensing functionality. In the case of aqueous fluids, the temperature controller should have the capacity to maintain the reservoirs at a temperature above about 0° C. In addition, the temperature controller may be adapted to lower the temperature in the reservoirs. Such temperature lowering may be required because repeated application of acoustic radiation to a reservoir of fluid may result in heating of the fluid. Such heating can result in unwanted changes in fluid properties such as viscosity, surface tension, and density. Design and construction of such temperature controlling controller are known to one of ordinary skill in the art and may comprise, e.g., components such a temperature sensor, a heating element, a cooling element, or a combination thereof.

Moreover, an ejection device may be adapted to dispense fluids of virtually any type and amount desired. The fluid may be aqueous and/or nonaqueous. Examples of fluids include, but are not limited to, aqueous fluids including water per se and water-solvated ionic and non-ionic solutions, organic solvents, lipidic liquids, suspensions of immiscible fluids, and suspensions or slurries of solids in liquids. Because the ejection device is readily adapted for use with high temperatures, fluids such as liquid metals, ceramic materials, and glasses may be used.

The droplet ejection device is capable of ejecting droplets into an inlet or array of inlets associated with one or more analytical devices such as a mass spectrometer (not shown). Further description of a droplet ejection device that ejects wavelength-scale droplets towards one or more inlets of one or more analytical devices can be found in U.S. Pat. No. 6,603,118 (see, e.g., Col. 19, line 16), which is incorporated by reference herein in its entirety.

The droplet ejection device is also capable of ejecting onto a number of different types of substrates. Examples include wafers, slides, well plates, or membranes. In addition, the substrate may be porous or nonporous as required for deposition of a particular fluid. Suitable substrate materials include, but are not limited to, supports that are typically used for solid phase chemical synthesis, such as polymeric materials (e.g., polystyrene, polyvinyl acetate, polyvinyl chloride, polyvinyl pyrrolidone, polyacrylonitrile, polyacrylamide, polymethyl methacrylate, polytetrafluoroethylene, polyethylene, polypropylene, polyvinylidene fluoride, polycarbonate, and divinylbenzene styrene-based polymers), agarose (e.g., Sepharose®), dextran (e.g., Sephadex®), cellulosic polymers and other polysaccharides, silica and silica-based materials, glass (particularly controlled pore glass, or "CPG") and functionalized glasses, ceramics, such substrates treated with surface coatings, e.g., with microporous polymers (particularly cellulosic polymers such as nitrocellulose), microporous metallic compounds (particularly microporous aluminum) antibody-binding proteins (available from Pierce Chemical Co., Rockford Ill.), bisphenol A polycarbonate, or the like.

The device may also include or be communicatively coupled with computer components configured to receive input from an operator, to operate the device, to provide data back to the operator. In one embodiment, such computer components include one or more of any of the following: a processor, a memory, a display device, a persistent storage device, an input/output device, a network adapter. This list is merely exemplary, and other embodiments may have different computer architectures. In one embodiment, computer program instructions describing tonebursts and their timing of application are stored in the memory or another non-transitory computer readable storage medium and are transferred to the processor in order to control the operation of the droplet ejector. Further computer program instructions may other pulses such as interrogation pulses, and/or control the positioning devices controlling the relative position between the reservoirs and the ejector.

III. Device Operation

In operation, reservoirs 13 and 15 are each filled with first and second fluids 14 and 16, respectively, as shown in FIG. 5. The acoustic ejector 33 is positionable by an ejector positioning system 61, shown below reservoir 13, in order to achieve acoustic coupling between the ejector and the reservoir through acoustic coupling medium 25. Once the ejector, the reservoir, and the substrate are in proper alignment, the acoustic radiation generator 35 is activated to produce acoustic radiation that is directed toward a free fluid surface 14S of the first reservoir. The acoustic radiation will then travel in a generally upward direction toward the free fluid surface 14S. The acoustic radiation will be reflected under different circumstances. Typically, reflection will occur when there is a change in the acoustic property of the medium through which the acoustic radiation is transmitted. It has been observed that a portion of the acoustic radiation traveling upward will be reflected from by the reservoir bases 13B and 15B as well as the free surfaces 14S and 16S of the fluids contained in the reservoirs 13 and 15.

III.A Analysis

Acoustic radiation may be employed not only in droplet ejection, but also to provide data to the analyzer. In an analytical mode, the acoustic radiation generator is typically activated so as to generate low energy acoustic radiation that is insufficiently energetic to eject a droplet from the fluid surface. This is typically done using an extremely short pulse (e.g., on the order of tens of nanoseconds, or just a few wavelengths) relative to that required for droplet ejection (on the order of microseconds). These tonebursts are so brief that they usually do not substantively affect the fluid. They act instead to "ping" the free surface of the fluid without substantively altering it. By determining the time it takes for the acoustic radiation to be reflected by the fluid surface back to the acoustic radiation generator, and then correlating that time with the speed of sound in the fluid, the distance—and thus the fluid height—may be calculated. One way to compute the height is to multiply the speed of sound in the fluid by one half the time between receipt of an echo from the top of the bottom of the reservoir and receipt of an echo from the fluid surface. Further description of how to determine the fluid height using interrogation tonebursts can be found in U.S. Pat. No. 6,938,995, which is incorporated by reference herein in its entirety. Knowledge of the height of the free surface of the fluid in the reservoir is desirable so that the focal point of the acoustic radiation can be positioned at or near the surface of the fluid. Of course, care must be taken in order to ensure that acoustic radiation reflected by the interface between the reservoir base and the fluid is accounted for and discounted so that acoustic assessment is based on the travel time of the acoustic radiation within the fluid only.

This acoustic analysis may also be used to determine the power used to eject droplets. In one embodiment, the analyzer determines the power based on the Fourier transform of the sound reflected from the surface of the fluid (or a protuberance or mound existing thereon). Further description regarding how to adjust the power based on this sound reflection can be found in U.S. Pat. No. 7,899,645, which is incorporated by reference herein in its entirety.

III.B Droplet Ejection Onto a Substrate

FIG. 5 illustrates example droplet ejection onto a substrate. The process is similar for injection into the inlet of an analytical device. In a droplet ejection mode, substrate 53 is positioned above and in proximity to the first reservoir 13 such that one surface of the substrate, shown in FIG. 5 as underside surface 51, faces the reservoir and is substantially parallel to the surface 14S of the fluid 14 therein. Once the ejector, the reservoir, and the substrate are in proper alignment, the acoustic radiation generator 35 is activated to produce acoustic radiation that is directed by the focusing system 37 to a focal point 14P near the fluid surface 14S of the first reservoir. As shown, the focusing system generally has an F-number greater than 1.

The intensity and directionality of the focused acoustic radiation and its frequency ranges are determined based on the height/volume of the fluid, geometric data associated with the reservoir (e.g., size, shape) and any other determined properties of the fluid. The intensity and directionality of the focused acoustic radiation are generally selected to produce droplets of consistent size and velocity. Generally, any sequence of tonebursts which generates droplets may be repeated iteratively in time to eject multiple series of droplets.

Droplets (illustrated is a single droplet 14D, but multiple droplets are also envisioned) are ejected from the fluid surface 14S onto a designated site on the underside surface 51 of the substrate. The ejected droplets may be retained on the substrate surface by solidifying thereon after contact, for example by maintaining the substrate at a low temperature. Alternatively, or in addition, a molecular moiety within the droplet attaches to the substrate surface after contract, through adsorption, physical immobilization, or covalent binding.

The process may be repeated for ejection onto other surfaces or into different inlets. Prior to subsequent ejections, the device is repositioned with respect to the surface or inlet receiving the later-ejected droplets. FIG. 5B illustrates an example using a substrate, where a substrate positioning system 65 repositions the substrate 53 over reservoir 15 in order to receive droplet/s therefrom at a second designated site as illustrated in FIG. 5B. FIG. 5B also shows that the ejector 33 has been repositioned by the ejector positioning system 61 below reservoir 15 and in acoustically coupled relationship thereto by virtue of acoustic coupling medium 25. Once properly aligned, the process described above may be repeated including, for example, analysis using low energy acoustic radiation and subsequent ejection once desired quantities have been determined. Subsequent droplet ejections may also make use of historical droplet ejection data from previous reservoirs in a particular batch run, or using prior ejection data regarding similar fluids or through the use of interrogation pulses and analysis. Again, there may be a need to reposition the ejector after analysis so as to reposition the acoustic radiation generator with respect to the fluid surface, in order to ensure that the focal point of the ejection acoustic wave and its frequency ranges is near the fluid surface, where desired. Should the results of the assessment indicate that fluid may be dispensed from the reservoir, focusing system 37 is employed to direct higher energy acoustic radiation to a focal point 16P within fluid 16 near the fluid surface 16S, thereby ejecting droplet 16D onto the substrate 53.

III.C Ejection of a Main Droplet and Satellites

Focused acoustic radiation incident on a free fluid surface can be used to generate multiple fluid droplets. For appropriately focused acoustic radiation within a range of frequencies, radiation pressure at the free fluid surface from an incident focused acoustic wave of finite temporal duration results in the generation of a mound at the fluid surface. This mound pinches off to produce a droplet. The size of this droplet is related to the dimension of the mound that is produced by the acoustic radiation pressure, which in turn is related to the focal spot size of the acoustic beam at the fluid surface. Consequently, the ejected droplet has a size on the order of the acoustic focal beam diameter. Relatively few, smaller droplets known as satellites may also be produced, but these are always associated with production of a main drop, whose diameter is of the order of the acoustic focal beam size. The production of these "large", primary droplets, can be extremely reproducible, over a large range of fluids. As an example of the size dimensions typically encountered, a 10 MHz acoustic beam that is focused at a water/air interface, will produce a droplet of water, of the order of 150 micrometers (um) in diameter. This corresponds to the acoustic wavelength in the water at 10 MHz, and hence to the approximate focused acoustic beam diameter at the fluid surface (it is assumed for simplicity that an F-number 1 lens is used to produce the acoustic beam).

For some applications, such as loading sample into a mass spectrometer, a much smaller droplet size may be required. In such cases, the presence of a large droplet (e.g., of order 150 μm diameter, or on the order of the acoustic wavelength in fluid) is not desirable. One way to obtain "small" droplets would be to use an acoustic beam of much smaller focal spot size—for example, on the order of 10 um in diameter, to eject droplets using the traditional acoustic droplet ejection technique. To create an acoustic beam of 10 μm focal spot size would require acoustic waves of order 150 MHz. While such an acoustic beam can be produced, the higher frequency and smaller acoustic wavelength requires smaller length scales for sample containment, and introduces significant issues with acoustic attenuation in the sample fluid and sample container. Furthermore, use of a higher acoustic frequency transducer in an ejection device makes it impossible to use that same transducer to eject large droplets.

III.D Mound Shattering for the Ejection of Multiple Subwavelength Droplets

In one implementation, the droplet ejection device is configured to retain the ability to produce large (e.g., 150 μm) droplets using lower frequency (e.g., 10 MHz acoustic waves). This ejection device is also configured to use a second mode of acoustic excitation that suppresses the ejection of the large (e.g., 150 μm diameter) droplets and, instead, it enables the ejection of small droplets (e.g., on the order 10 μm diameter). A specific time development of the acoustic excitation is employed that does not lead to an ejection of a primary large droplet, whose diameter is of the order of the focused acoustic beam size, but instead produces a distribution of smaller droplets, whose sizes are roughly an order of magnitude smaller than the focused acoustic beam size. Generally, the focal spot size of the acoustic beam is roughly equal to the acoustic wavelength, in the case of a lens having a F-number of 1, or larger than the acoustic wavelength, in the case of a lens having a F-number greater than 1. The droplets created using this mound shattering technique are substantially smaller than both the acoustic wavelength in the fluid and the focal spot size at the fluid surface. In one embodiment, these smaller droplets may have diameters that are 40% the size of the focused acoustic beam and smaller. Particularly, there is no primary large droplet emerging from the mound that comprises the majority of the ejected fluid volume and/or that is significantly larger than all the other ejected droplets. In another embodiment, there is no droplet which comprises more than 10% of the total fluid volume ejected from the mount. In another embodiment, the majority of droplets are 10% of the size of the focused acoustic beam and smaller. Droplets produced according to this mode may be referred to as subwavelength diameter droplets because their diameters are smaller than can be produced with a single toneburst using the same transducer.

The acoustic excitation that produces these small droplets typically involves at least two applications of focused acoustic radiation being received at the focal spot, separated in time. An initial (first) toneburst, carries sufficient acoustic radiation to produce a significant mound at the free fluid surface, but insufficient energy to produce a droplet using just that toneburst alone (e.g., 3 decibels below the power necessary to eject a droplet). Upon application of the first toneburst, the mound will grow out the free surface of the fluid, and eventually recede back into the free surface of the fluid if no other substantive tonebursts are applied that affect the fluid (e.g., excluding interrogation tonebursts). A follow up (second) toneburst is subsequently excited, so that its acoustic radiation impinges on the fluid surface at a time after the mound has already begun collapsing back into the volume of fluid, but before the mound has entirely receded back into the free surface of the fluid. The interaction of the collapsing mound and the second toneburst results in capillary wave formation at the fluid surface, which in turn shatters the mound, producing multiple droplets each much smaller than the acoustic wavelength in the fluid (e.g., for tonebursts on the order of 10 MHz, droplets on the order of 10 μm in diameter are produced) that are emitted from the mound substantially in the direction of the acoustic beam propagation. The power of the second toneburst varies depending upon the properties of the fluid and the system as a whole, however, the power of the second toneburst scales with the power of the first toneburst, such that the ratio of the power between the first and second tonebursts remains at least approximately the same. In one embodiment, this technique ejects at least 10 droplets and upwards of hundreds of droplets using as few as the two tonebursts described above. In some instances, droplets are effectively aerosolized such that they have a diameter less than 5 μm.

In one embodiment, this technique ejects at least 10 droplets with the majority of the droplet trajectories within 5 degrees of each other and also within 5 degrees of the direction of the applied tonebursts. In another embodiment, the technique ejects at least 10 droplets with the majority of these droplet trajectories within 2 degrees of each other and the applied tonebursts. In another, the technique ejects at least 10 droplets with the majority of the droplet trajectories within 1 degree of each other and the applied tonebursts.

Figure 3:
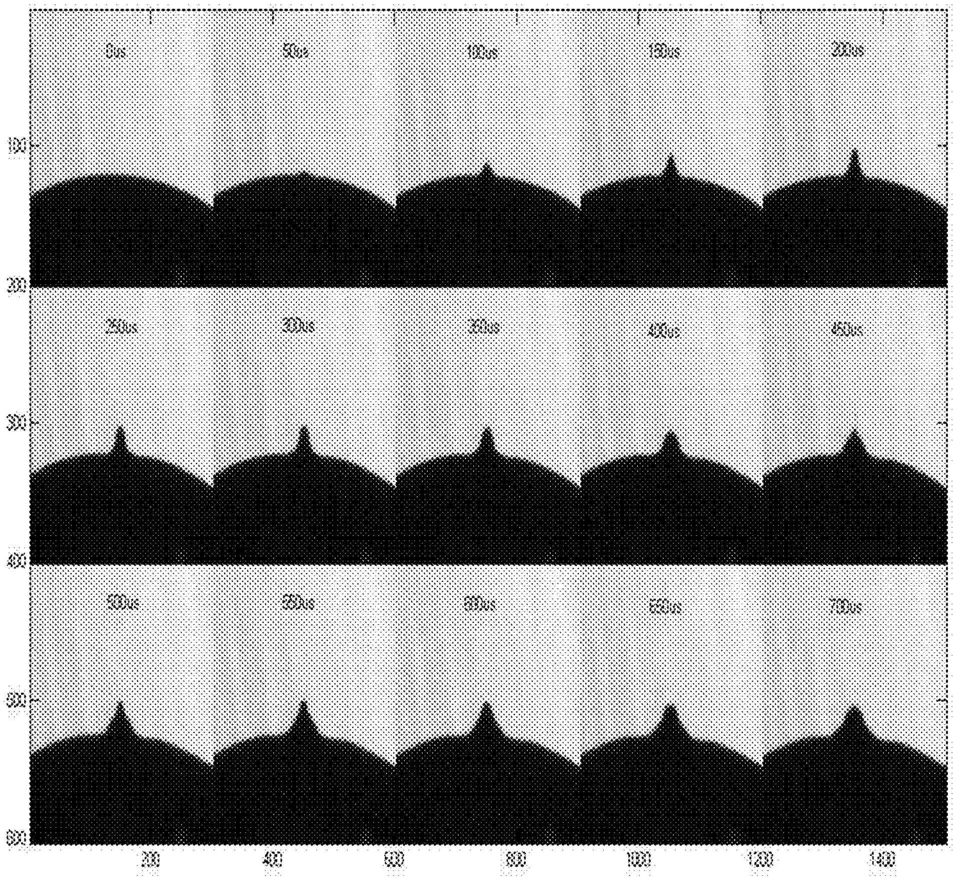
FIG. 3 depicts a series of successive stroboscopic images taken at successive time intervals that depict the free surface of a fluid reservoir during the ejection of small droplets using focused acoustic radiation, according to one embodiment.
Figure 4:
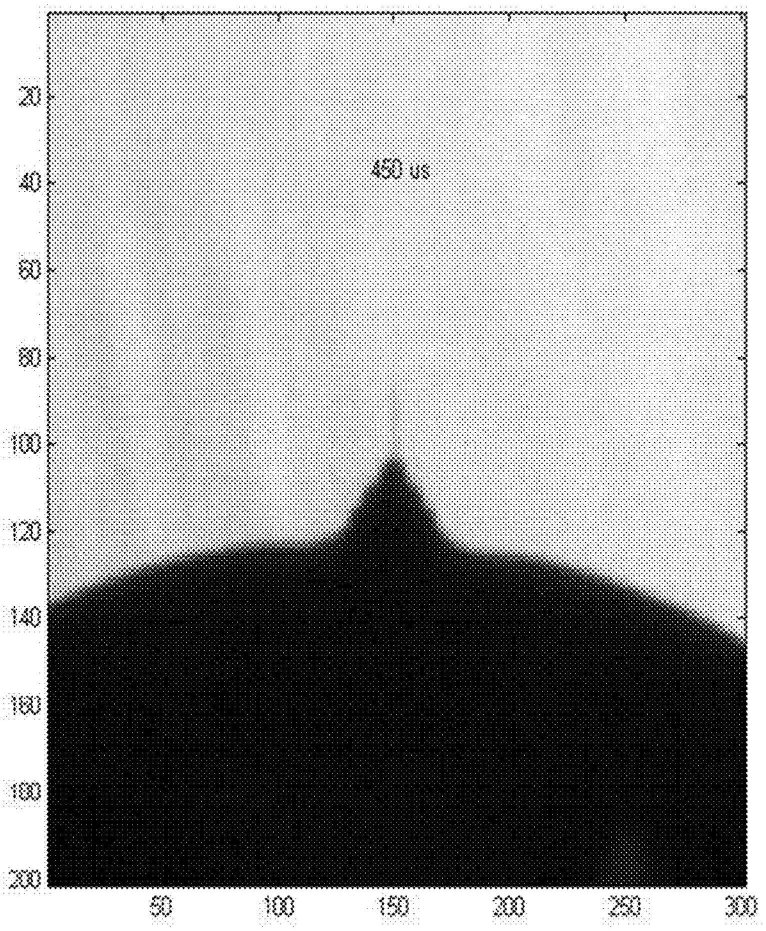
FIG. 4 is single stroboscopic image that depicts the free surface of a fluid reservoir during the ejection of a subwavelength droplet using focused acoustic radiation, according to one embodiment.

FIGS. 3 and 4 illustrate an example application of this technique to an example well. FIG. 3 illustrates a series of successive stroboscopic images taken at successive time intervals that depict the free surface of a fluid reservoir during the ejection of small droplets using focused acoustic radiation, according to one embodiment. In the example illustrated in FIG. 3, the focused acoustic radiation comprises two tonebursts, chirping from 11 megahertz (MHz) up to 13 MHz. In between each tonebursts is a gap in time where no substantive focused acoustic radiation is applied, for example as illustrated in FIG. 2C. The second toneburst is applied after the mound formed by the first toneburst has begun to recede, thus shattering the mound to create the small droplets which are emitted from the tip of the mound and in the droplet trajectories are in substantially the same direction as the travel of the first and second acoustic tonebursts used to form and shatter the mound, respectively.

As illustrated in FIG. 3, the first toneburst is excited at time t=0, and has duration 120 μs. This toneburst creates a mound at the free fluid surface that grows, until about t=250 μs. Between t=300 μs and t=400 μs, the mound begins to collapse. The second toneburst is excited at t=410 μs, and has duration 30 μs. The energy transferred to the fluid surface from this second toneburst excitation results in a perturbation of the collapsing mound, which is evident in the frame labeled 450 μs, in the above image. Between 400 and 450 μs, capillary waves along the mound produce small drops. For times greater than 500 μs, the mound continues to collapse, with no further drop ejection. Thus, this approach allows the small droplets to be produced at a known specific time (in the above case, at t=450 μs), and from a known specific location. No larger drop (of the order of the acoustic beam size) is produced.

FIG. 4 illustrates a magnified image of the small droplet ejection at time t=450 μs. The presence of the capillary waves is apparent in the image. The example of FIG. 4 illustrates the point in time following the excitation of the second toneburst, at which the acoustic radiation associated with the second toneburst interacts with the mound formed by the first toneburst, as that mound begins to recede into the volume of the fluid.

In one implementation, rather than waiting until the mound has receded to apply the second toneburst, the second toneburst is applied when the mound has come to rest, that is when it is no longer increasing in size but has not yet begun to recede.

Droplets created using this technique scale in size approximately proportionally with the frequency ranges of both the first and second tonebursts of focused acoustic radiation. For example, droplet size may be scaled by scaling together the acoustic center frequencies of the first and second tonebursts. As a corollary to this, focal acoustic spot size at the fluid surface scales approximately inversely with acoustic frequency. Thus, lower acoustic center frequencies result in a larger initial mound at the free fluid surface. As introduced above, the size of this droplet is related to the dimension of the mound that is produced by the acoustic radiation pressure. Consequently, by controlling the center frequency of the focused acoustic radiation, the drop size distribution of subwavelength diameter droplets can be controlled. Further amount of time the mound takes to rise and fall increases as the mound size is increased. This in turn affects the timing of the second toneburst used to affect the subwavelength diameter droplets. Continuing with the example from FIG. 3 above, the center acoustic frequency of the first and second tonebursts is of the order of 11.5 MHz, and the acoustic transducer has an F-number of 2. The first toneburst is 120 μs long, the second toneburst is 30 μs long. The second toneburst is applied 290 μs after the first toneburst is applied. The ratio of the amplitude of the first toneburst divided by the amplitude of the second toneburst is 0.58. The mean droplet diameter is approximately 10.6 μm and generally the largest droplets produced are smaller than 30 μm (prior to coalescing with other nearby droplets), as determined from measurements of droplets deposited onto a glass slide. In another embodiment, all else being equal to the previous example, the second toneburst is 13 μs long and the mean droplet diameter is 9.8 μm.

Other acoustic center frequencies are also possible. For example, the device may be operated using first and second tonebursts having the acoustic center frequency of 6.25 MHz. In this example, the acoustic transducer has an F-number of 2. The first toneburst has a duration of 200 μs. The second toneburst has a duration of 15 μs. The second toneburst is applied 1000 μs after the first toneburst. The ratio of amplitudes between the tonebursts is the same as in the 11.5 MHz example above. The mean droplet diameter is approximately 18 μm and generally the largest droplets produced are smaller than 40 μm (prior to coalescing), based on test droplets deposited onto a glass slide. Thus, between the two examples the mean droplet diameter increases by a factor of 1.7 for a change in acoustic center frequency of 1/1.84, as focal spot size increases as acoustic center frequency decreases.

The above embodiment describes a case involving only two tonebursts. This is useful in a case where the properties of the fluid and system are known, and as a result the subwavelength diameter droplets can be created without needing to determine any additional information. However it should be understood that different numbers of tonebursts and more complicated tonebursts may also be used depending upon the circumstances, for example to produce a large volume of small droplets. For example, three or more separated tonebursts may be used instead of merely two tonebursts.

In other embodiments, not all properties of the system (e.g., fluids, containers) will be known in advance. Additional interrogation tonebursts can be added into the process in order to determine these unknown quantities. For example, for an unknown fluid, it may not be known what frequency ranges and powers are needed to create the subwavelength diameter droplets. Additional tonebursts such as interrogation tonebursts can used to obtain this information in a dynamic manner. For example, in a device where droplets are to be ejected from multiple wells containing different unknown fluids, incorporating interrogation tonebursts into the process allows dynamic determination of the quantities necessary to eject droplets as described above, without any prior knowledge of the fluids to be ejected.

Acoustic interrogation is useful for probing the properties of the fluid without substantially affecting the fluid, e.g., without substantially affecting the properties of any droplets that are in the process of being formed. These tonebursts may be relatively strong in amplitude in order (e.g., on the order of the amplitude needed to eject droplets, or greater or smaller) to provide an adequate signal to noise ratio for the signal that is reflected back from the surface of the fluid for measurement. The total acoustic power of a toneburst scales as the square of the toneburst amplitude, multiplied by the duration of the toneburst, so that an interrogation toneburst may have relatively large amplitude but very small total power, compared to an ejection toneburst, because its duration is so short. Thus, where it is stated above that two tonebursts occur sequentially with no other tonebursts interceding between the two tonebursts that substantively affect the creation of a droplet, this excludes interrogation tonebursts that have low total power and which may be used at any time to provide information about the height of the free surface of the fluid (or any mound or protuberance formed thereon).

As discussed above, one quantity not known in advance may be the fluid height. In one embodiment of subwavelength diameter droplet ejection, an interrogation pulse is initially sent out to determine the height of the free surface of the fluid prior to any droplet forming. Responsive to measuring the height, the transducer may be repositioned to a new position to focus the focused acoustic radiation on the free surface of the fluid. The first toneburst is then applied at a first, low power insufficient to eject any droplets in all possible fluids. This low power toneburst may also be referred to as a subthreshold toneburst. Subsequently, one or more interrogation pulses may be used to measure the fluid height to analyze the timing and height of the mound generated by the first toneburst. These interrogations may also be used to determine when to apply the second toneburst, based on the frequency/frequencies of the interrogation pulse and when the measured mound peaks in height and begins to recede. Depending upon the results of the interrogation, e.g., the height of the mound, the first toneburst may be repeated at higher power, or it may be determined that the height was sufficient for use with a second toneburst to create the subwavelength diameter droplets. This part of the process may be repeated as necessary to achieve desired characteristics for the mound created by the first toneburst.

Subsequently, the first toneburst is repeated in order to generate the mound used to eject droplets. As above, after a gap the second toneburst is applied to generate the subwavelength diameter droplets. In one embodiment, after the first toneburst is fired, subsequent interrogation pulses are used to measure the fluid height as the mound grows and begins to recede. Alternatively, this may have already been determined through interrogations when the power of the first toneburst was being determined. Responsive to the mound being detected as beginning to recede, the second toneburst is applied.

Droplet ejection can be performed without the presence of an external electric field, and it is expected that the droplets produced carried little net electric charge. In some cases, it is desirable that the droplets have a net free charge. It is possible, assuming the fluid has some reasonable conductivity, to induce a free charge on the small droplets by placing the fluid in an electric field. This may be accomplished by positioning an electrode above the fluid surface, and applying an electric potential to the electrode, relative to the fluid, or to the container holding the fluid. This allows for the creation of small atomized droplets with a net free charge.

A benefit of adding a net free charge to droplets for subwavelength diameter droplet ejection is that the net free charge makes it possible to know precisely in time when the small droplets are being ejected. In one implementation, a series of switched voltages may applied to the fluid near in time to the activation of the second toneburst in order to place a charge on the small droplets during their formation. The switched voltages are turned on and off, or set to other voltage potentials according to a spatial and/or temporal sequence. Consequently, subwavelength diameter droplets ejected during different times as a result of the same second toneburst will have varying and different potentials. Knowing when droplets are ejected is useful for knowing when the droplets will reach an analytical instrument, for example a mass spectrometer coupled to an inlet receiving the droplets. Knowing when droplets are ejected is also useful in performing time-resolved measurement, for example taking a sample of a fluid at a specific time after some other well-defined perturbation of the fluid.

Adding net free charge to ejected droplets also has other benefits. For example, differing charges on differing droplets can be used to guide the created small droplets to a desired location. As another example droplets can be filtered according to their size as comparatively larger droplets will have a different voltage/charge than comparatively smaller droplets, and under an applied electric field will travel in different directions depending upon the direction of the field and their respective voltage/charge.

V. Additional Considerations

As used in this specification and the appended claims, the singular forms "a," "an," and "the" include plural referents unless the context clearly dictates otherwise. Thus, for example, reference to "a reservoir" includes a single reservoir as well as a plurality of reservoirs, reference to "a fluid" includes a single fluid and a plurality of fluids, reference to "a frequency range" includes a single frequency range and a plurality of ranges, and reference to "an ejector" includes a single ejector as well as plurality of ejectors and the like.

It is to be understood that the invention is not limited to specific fluids, frequency ranges, or device structures, as such may vary. It is to be understood that while the invention has been described in conjunction with a number of specific embodiments, the foregoing description is intended to illustrate and not limit the scope of the invention. Other aspects, advantages and modifications will be apparent to those skilled in the art. All patents, patent applications, journal articles and other references cited herein are incorporated by reference in their entireties.

What is claimed is:

1. A method of creating a collection of droplets from a fluid in a reservoir, comprising:

applying a first toneburst of focused acoustic radiation to the fluid in the reservoir, the first toneburst configured to raise a mound on a free surface of the fluid, the first toneburst having an acoustic wavelength in the fluid; and applying a second toneburst to the mound during a time period occurring after the first toneburst, and between when the mound has reached maximum height due to the first toneburst, but before the mound has collapsed, the second toneburst configured to break up the mound into a plurality of droplets each having a diameter smaller than the acoustic wavelength.

2. The method of claim 1, comprising:

applying at least one interrogation toneburst to the fluid in the reservoir, the interrogation toneburst having a duration shorter in time than both the first and second toneburst;

analyzing an acoustic reflection generated by the interrogation toneburst to determine a height of the free surface of the fluid in the reservoir.

3. The method of claim 2, comprising:

adjusting a relative position between the reservoir and an acoustic ejector and applying the first and second tonebursts based in part on the height.

4. The method of claim 1, comprising:

applying at least one interrogation toneburst to the fluid in the reservoir between the first and second tonebursts, the interrogation toneburst having a duration shorter in time than both the first and second tonebursts;

analyzing at least one acoustic reflection from the mound generated by the interrogation toneburst and determining an amplitude of the second toneburst based in part on the analyzing.

5. The method of claim 1, comprising:

applying at least one interrogation toneburst to the fluid in the reservoir between the first and second tonebursts, the interrogation toneburst having a duration shorter in time than both the first and second tonebursts;

analyzing at least one acoustic reflection from the mound generated by the interrogation toneburst and determining when to apply the second toneburst based in part on the analyzing.

6. The method of claim 1, comprising:

applying at least one interrogation toneburst to the fluid in the reservoir, the interrogation toneburst having a duration shorter in time than both the first and second tonebursts;

analyzing an acoustic reflection generated by the interrogation toneburst and determining at least one operating parameter of each of the first and second tonebursts based in part on the analyzing.

7. The method of claim 1, comprising:

applying a third toneburst to the fluid surface when the fluid surface is undisturbed, the third toneburst comprising sufficient power to eject at least one droplet from the fluid surface, the third toneburst also having the acoustic wavelength.

8. The method of claim 1, wherein the time period when the second toneburst is applied is after the mound has reached maximum height.

9. The method of claim 1, wherein the first and second tonebursts are separated by a period of time during which no acoustic radiation is produced having sufficient power to substantially affect either the mound or the ejected droplets, wherein power is determined based on an amplitude and a duration of acoustic radiation.

10. The method of claim 9, wherein the first and second tonebursts are separated by a time period during which no acoustic radiation is produced.

11. The method of claim 1, wherein each droplet of the plurality of droplets has a volume that is smaller than a volume of a droplet ejected using a single toneburst from a same acoustic transducer used to apply the first and second tonebursts.

12. The method of claim 1, wherein a majority of the droplets of the plurality of droplets each have volumes less than 10% of a total fluid volume ejected from the mound.

13. A droplet ejection device configured to eject droplets from a fluid in a reservoir, the device comprising an acoustic ejector configured to:

apply a first toneburst of focused acoustic radiation to the fluid in the reservoir, the first toneburst configured raise a mound on a free surface of the fluid, the first toneburst having an acoustic wavelength in the fluid; and apply a second toneburst to the mound during a time period occurring after the first toneburst, and between when the mound has reached maximum height due to the first toneburst, but before the mound has collapsed, the second toneburst configured to break up the fluid in the mound into a plurality droplets each having a diameter smaller than the acoustic wavelength.

14. The device of claim 13, wherein the acoustic ejector is further configured to:

apply an interrogation toneburst to the fluid in the reservoir, the interrogation toneburst having a duration shorter in time than both the first and second tonebursts;

and wherein the device comprises an analyzer configured to:

analyze an acoustic reflection generated by the interrogation toneburst to determine a height of the free surface of the fluid in the reservoir.

15. The device of claim 14, comprising:

at least one positioning device configured to:

adjust a relative position between the reservoir the acoustic ejector;

and wherein the acoustic ejector is further configured to apply the first and second tonebursts based on the height.

16. The device of claim 13, wherein the acoustic ejector is further configured to:

apply at least one interrogation toneburst to the fluid in the reservoir between the first and second tonebursts, the interrogation toneburst having a duration shorter in time than both the first and second tonebursts;

and wherein the device comprises an analyzer configured to:

analyze at least one acoustic reflection from the mound generated by the interrogation toneburst to determine an amplitude of the second toneburst.

17. The device of claim 13, wherein the acoustic ejector is further configured to:

apply at least one interrogation toneburst to the fluid in the reservoir between the first and second tonebursts, the interrogation toneburst having a duration shorter in time than both the first and second tonebursts;

and wherein the device comprises an analyzer configured to:

analyze at least one acoustic reflection from the mound generated by the interrogation toneburst to determine when to apply the second toneburst.

18. The device of claim 13, wherein the acoustic ejector is further configured to:

apply an interrogation toneburst to the fluid in the reservoir, the interrogation toneburst having a duration shorter in time than both the first and second tonebursts; and wherein the device comprises an analyzer configured to:

analyze an acoustic reflection generated by the interrogation toneburst to determine at least one property of each of the first and second tonebursts.

19. The device of claim 13, wherein the acoustic ejector is further configured to:

apply a third toneburst to the fluid surface when the fluid surface is undisturbed by the first and second tonebursts, the third toneburst comprising sufficient power to eject at least one droplet from the fluid surface, the third toneburst also having the acoustic wavelength.

20. The device of claim 13, wherein the time period when the second toneburst is applied is after the mound has reached maximum height.

21. The device of claim 13, wherein the first and second tonebursts are separated by a period of time during which no acoustic radiation is produced having sufficient power to substantially affect either the mound or the ejected droplets, wherein power is determined based on an amplitude and a duration of acoustic radiation.

22. The device of claim 21, wherein the first and second tonebursts are separated by a time period during which no acoustic radiation is produced.

23. The device of claim 13, wherein the ejected droplets each have a volume that is smaller than a volume of a droplet ejected using a single toneburst from a same acoustic transducer used to apply the first and second tonebursts.

24. The device of claim 13, wherein the ejected droplets and the first and second tonebursts are ejected in a substantially same direction.

25. The device of claim 13, wherein a majority of the droplets each have a volume less than 10% of a total fluid volume ejected from the mound.

26. The device of claim 13, wherein the acoustic ejector comprises an acoustic transducer, and wherein the first and second tonebursts are applied using that same acoustic transducer.

27. A method of ejecting a collection of droplets from a liquid sample in a reservoir, comprising:

applying focused acoustic radiation to the liquid sample in the reservoir using an acoustic transducer having an F-number of at least one, the focused acoustic radiation having an acoustic wavelength, the focused acoustic radiation configured raise and shatter a mound on a free surface of the liquid sample after the mound has reached maximum height but before the mound has collapsed, thereby breaking up a portion of a fluid making up the liquid sample in the mound into at least 10 droplets, each droplet having a diameter substantially smaller than the acoustic wavelength, with a majority of the droplets having ejection trajectories within 5 degrees of each other.

28. A method of ejecting multiple droplets from a reservoir, comprising:

applying a first toneburst to a fluid in the reservoir, the first toneburst configured to raise a mound on a free surface of the fluid; and applying a second toneburst to the fluid before the mound has collapsed, the second toneburst configured to break up the mound into a plurality of droplets.

29. A method of ejecting multiple droplets from a reservoir, comprising:

applying a toneburst to a fluid in the reservoir having a raised mound on a free surface of the fluid, the toneburst configured to break up a portion of the raised mound into a plurality of droplets.

30. A method of ejecting multiple droplets from a reservoir, comprising:

applying an interrogating toneburst to a fluid in the reservoir having a raised mound on a free surface of the fluid, the interrogating toneburst configured to generate an acoustic reflection from the mound without ejecting any fluid from the reservoir;

determining a property of the fluid in the reservoir based in part on the acoustic reflection; and applying an ejecting toneburst to the fluid in the reservoir based in part on the determined property, the ejecting toneburst configured to break up a portion of the raised mound into a plurality of droplets.

31. A method of ejecting multiple pluralities of multiple droplets from a reservoir, comprising:

ejecting multiple pluralities of droplets at a frequency by, at least:

applying a first toneburst to a fluid in the reservoir, the first toneburst configured to raise a mound on a free surface of the fluid; and applying a second toneburst to the fluid before the mound has collapsed, the second toneburst configured to break up the mound into a plurality of droplets.

32. The method of claim 31, wherein the frequency is at least 10 pluralities of droplets per second.

33. The method of claim 31, wherein the frequency is at least 1000 pluralities of droplets per second.

34. A method of ejecting droplets from a reservoir comprising:

energizing an acoustic ejector to apply acoustic radiation having a focal spot size at a fluid surface of a fluid to eject a plurality of droplets from the fluid in a manner such that a primary droplet having a diameter of the order of the focal spot size is not produced, the plurality of ejected droplets having a size an order of magnitude smaller than the focal spot size of the acoustic radiation.

35. The method of claim 34, wherein the droplets are introduced into a mass spectrometer.

36. A method of ejecting multiple droplets from a reservoir, comprising:

applying acoustic radiation to a fluid in the reservoir having a fluid mound on a free surface of the fluid, wherein the acoustic radiation simultaneously ejects a plurality of droplets from the fluid mound in substantially the same direction.

37. The method of claim 36, wherein the direction is substantially the same as a direction of propagation of the acoustic radiation.

38. The method of claim 36, wherein a majority of the droplets of the plurality of droplets are ejected along trajectories within 5 degrees of a direction of propagation of the acoustic radiation.

39. A method of ejecting aerosolized fluid from a reservoir, comprising:

applying acoustic radiation to a fluid in the reservoir having a fluid mound on a free surface of the fluid, wherein the acoustic radiation aerosolizes a portion of the fluid in the fluid mound and ejects the aerosolized portion of the fluid.

* * * * *